United States Patent
Mundry et al.

(10) Patent No.: US 8,465,104 B2
(45) Date of Patent: Jun. 18, 2013

(54) EXTRACTION SYSTEM FOR MINERAL EXTRACTION AND RETAINING DEVICE FOR A SENSOR SYSTEM THEREFOR

(75) Inventors: Sebastian M. Mundry, Ludinghausen (DE); Marco Ahler, Mulheim (DE); Simon Pauli, Lunen (DE); Stefan Hengstler, Lunen (DE); Henner Ruschkamp, Lunen (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 226 days.

(21) Appl. No.: 12/682,991

(22) PCT Filed: Oct. 7, 2008

(86) PCT No.: PCT/EP2008/008438
§ 371 (c)(1),
(2), (4) Date: Apr. 14, 2010

(87) PCT Pub. No.: WO2009/052938
PCT Pub. Date: Apr. 30, 2009

(65) Prior Publication Data
US 2012/0038205 A1 Feb. 16, 2012

(30) Foreign Application Priority Data
Oct. 18, 2007 (DE) .................... 20 2007 014 710 U

(51) Int. Cl.
*E21C 35/12* (2006.01)
(52) U.S. Cl.
USPC ............................................ 299/1.6; 299/1.1

(58) Field of Classification Search
USPC .............................................. 299/1.1, 1.2, 1.6
See application file for complete search history.

(56) References Cited

U.S. PATENT DOCUMENTS

| 4,185,876 A | * | 1/1980 | Pentith .......................... 299/45 |
| 4,981,327 A | | 1/1991 | Bessinger et al. |
| 4,992,657 A | * | 2/1991 | Reisner ......................... 250/253 |
| 5,334,838 A | | 8/1994 | Ramsden, Jr. |
| 6,361,119 B1 | | 3/2002 | Kussel |
| 6,397,569 B1 | | 6/2002 | Homburg et al. |
| 2002/0030400 A1 | * | 3/2002 | Frederick et al. ............... 299/95 |
| 2008/0185903 A1 | | 8/2008 | Bansov et al. |

FOREIGN PATENT DOCUMENTS

| AT | 003201 U1 | | 11/1999 |
| DE | 3904279 A1 | * | 8/1990 |
| DE | 19925949 A1 | | 12/2000 |
| GB | 2044032 A | | 10/1980 |
| GB | 2044032 A | * | 10/1980 |
| GB | 2086566 A | | 5/1982 |
| ZA | 995636 | | 3/2000 |

* cited by examiner

*Primary Examiner* — John Kreck
(74) *Attorney, Agent, or Firm* — Foley & Lardner

(57) ABSTRACT

The invention relates to an extraction system for mineral extraction, having a machine frame which is movable along a conveying device and which for each direction of travel, on its front side that, in operation, lies facing a working face, has hewing tools for the minerals to be won, and having a sensor system, disposed on the machine frame, for mineral/host rock recognition. In order to provide an extraction system which can be provided with or used with an improved sensor system, a retaining box for the sensor device is fastened in projecting arrangement to the front side of the machine frame, the retaining box preferably containing a georadar as the sensor system.

16 Claims, 2 Drawing Sheets

EXTRACTION SYSTEM FOR MINERAL EXTRACTION AND RETAINING DEVICE FOR A SENSOR SYSTEM THEREFOR

The invention relates to an extraction system for mineral extraction, having a machine frame which is movable along a conveying device and which for each direction of travel, on its front side that, in operation, lies facing a working face, has hewing tools for the minerals to be won, and having a sensor system, disposed on the machine frame, for mineral/host rock recognition. The invention also relates to a retaining device for a sensor system for mineral/host rock recognition in mineral extraction with an extraction system which is movable along a conveying device.

BACKGROUND OF INVENTION

In underground mining, it has long been known to improve the mining capacity of an extraction system for mineral extraction by virtue of the fact that the interface between floor rock and the mineral to be won, for example coal, is scanned by means of suitable sensor systems, in order to mine with the hewing tools of the extraction system, as far as possible, solely minerals at the floor. The known sensor systems consist almost exclusively of optical sensor systems, which, by means of suitable pressure elements (springs), are pressed against the floor in order to scan the optically different reflectivity of coal, on the one hand, and floor rock, on the other hand. Purely by way of example, reference is made to DE 199 25 949 A1, in which an optical sensor system, as a complex exchangeable part, is disposed in a vertically movable manner in a retaining box, which is fastened by means of push bolts in a recess on the front side of the machine frame of a coal plough and is open downward to the floor. In the coal plough of the generic type, above the sensor device, there is arranged a roof tool, with which the mining height of the extraction system can be changed. The known optical sensor system, by dint of its design, can scan the interface solely in the region of the floor.

According to the invention of this application, provided is an extraction system which can be provided or used with an improved sensor system.

More particularly, this is achieved according to the invention by the fact that a retaining box for the sensor system is fastened in projecting arrangement to the front side of the machine frame, the retaining box preferably containing a georadar as the sensor system. As a result of the projecting fastening of the retaining box, it is not only possible to be able to use other sensor systems, such as, in particular, a georadar, but, at the same time, the precondition is created that the entire working face, and not just the interface between the floor and the minerals to be extracted, can be scanned. The projecting fastening allows a direct, substantially optimal "view" of the working face, the working face being able to be scanned with the sensor system throughout the region lying, on the front side or working side, in front of a machine track on the conveyor, to in front of the canopy end of the canopy of a shield support.

In the preferred embodiment, the georadar and/or the retaining box are arranged centrally between the hewing tools. The number and angle of radiation of the sensors can be used to determine over what region of the working face a scanning of the interface between minerals and host rock should take place, while all sensors can be disposed in a protected manner in the reception space of the retaining box. A georadar is fundamentally suitable for use on both ploughing-type extraction systems and cutting-type extraction systems. A principal field of application of the present invention concerns extraction systems, however, in which the hewing tools consist of cutting rollers, i.e. in particular shearer loaders for coal extraction.

For numerous applications, it may be sufficient to fit the retaining box in a fixed position on the front side of the machine frame. In the case of height-adjustable hewing tools, in particular of height-adjustable hewing tools on the respectively leading front side of the extraction system, it can be advantageous, however, if the retaining box is height-adjustable or is fastenable in different height positions to the machine frame.

In the particularly preferred embodiment, the retaining box is of multipart construction and has a main box accommodating the georadar and having downward and/or upward facing window openings, to both sides of which main box deflector elements are arranged. The retaining box can then be constructed as a closed retaining box, from which only the signal and supply lines for the sensor system have to be led, preferably on the rear side, while the two deflector elements serve to protect the main box and lead fragmented rock or debris past the main box.

The aforesaid can be achieved in a retaining device for a sensor system by the fact that the retaining device utilizes a multipart retaining box for a georadar and can be detachably fastened in projecting arrangement to a front side of a machine frame of the extraction system. The retaining box here preferably has a main box accommodating the georadar and having downward and/or upward facing window openings, and further has deflector elements, which can be arranged to both sides of the retaining box.

Expediently, the window openings are configured in a roof wall and/or a bottom wall of the main box, which respectively run obliquely to a rear wall of the main box, to enable the working face to be scanned in the region of the floor and, where necessary, also in the region of the roof, with the sensors of the georadar, which sensors are disposed in the main box. The windows are preferably closed off by means of exchangeable viewing plates, in particular plastics sheets, for the georadar, in order that, on the one hand, the electromagnetic waves of the sensors of the georadar can scan the working face and, at the same time, the radiated waves can be received by means of the sensors with least possible obstruction. In the event of excessive wearing of the viewing plates, these can be exchanged for new viewing plates.

In the particularly preferred embodiment, the main box is elongated in configuration and/or is closed off by means of trapezoidal side walls and a rectangular end plate. As a result of the trapezoidal shape of the retaining box, a relatively low resistance to debris or the like is achieved, while also, at the same time, a diversion function is maintained in the region of the main box. Advantageously, the deflector elements consist of a back plate, a plurality of stiffening ribs and a trapezoidal connecting wall, which are welded together to form a stable welded construction. The upper and the lower stiffening rib of the deflector elements preferably run obliquely to the back plate and, in particular, in alignment with the bottom wall and the roof wall on the main box. When minerals are to be won, should the diversion function not be fully achievable with correspondingly simply constructed deflector elements, each deflector element can additionally be fitted with a suitable cutter bar in order, where necessary, with the, in the direction of travel, leading cutter bar, to cut away material which has stayed behind the hewing tools in the direction of travel. Each deflector element can also be fitted with a wear plate as additional wear protection, or can have a surface layer hardening.

Also preferably, the rear wall can protrude beyond the roof wall and bottom wall, or the back plate can protrude beyond the upper and the lower stiffening plate, in the upward and downward direction, with a screw hole punched strip, in order that the machine box can be fastened relatively easily in projecting arrangement to the machine frame. In the fitted state of the retaining box on the extraction system, the holes of the screw hole punched strip are passed through preferably by clamping screws, which, where necessary together with dowel pins, serve to absorb the longitudinal and transverse forces and, at the same time, form predetermined breaking points between the machine frame, on the one hand, and the retaining box, on the other hand.

These and other objects, aspects, features, developments, embodiments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF EMBODIMENTS

Figure 1:
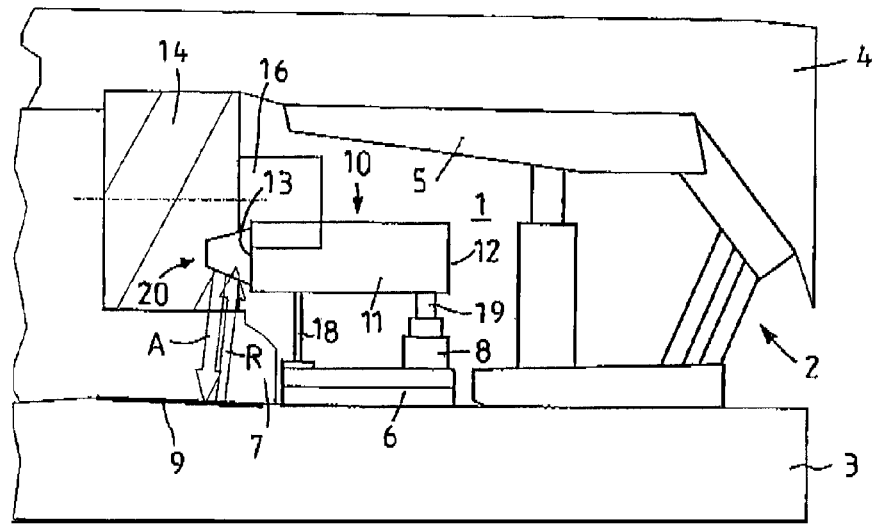
FIG. 1 shows in schematic representation a shearer loader, as an extraction system according to the invention, in operation.
Figure 2:
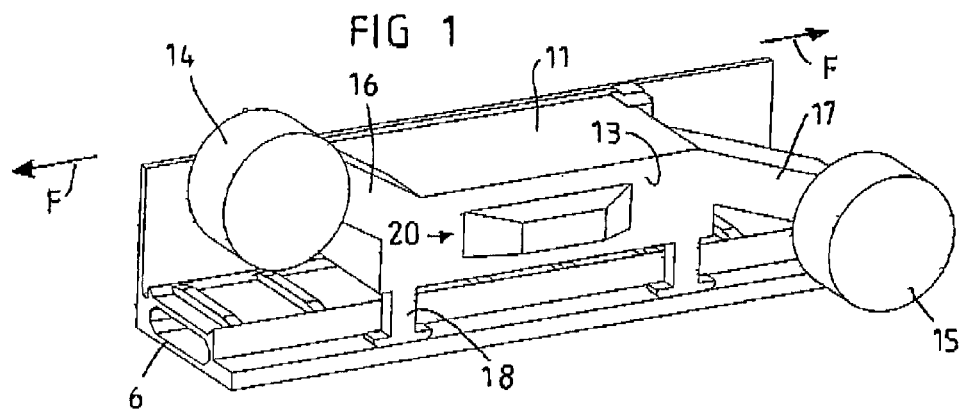
FIG. 2 shows in schematic representation a view of the front side of the shearer loader from FIG. 1.

Referring now to the drawings wherein the showings are for the purpose of illustrating preferred and alternative embodiments of the invention only and not for the purpose of limiting the same, FIG. 1 shows an underground face 1 for coal extraction is represented in a system diagram. The face 1 is kept open by means of a hydraulic shield support 2 between the so-called floor 3 and the roof 4. Beneath a shield canopy 5 of the shield support 2 there is arranged a conveyor, such as, for example, a chain scraper conveyor 6, with which the mineral, such as, in particular, coal, won by means of the shearer loader 10 is transported away from the face. The shearer loader 10 has a machine frame 11, the rear side 12 of which lies facing the shield support 2, i.e. the waste material side, and the front side 13 of which lies facing the working face 7. As hewing tools, the shearer loader 10, as also shown by FIG. 2, has two cutting roller wheels 14, 15, which are respectively supported on the machine frame 11 by means of a supporting or swivel arm 16 or 17. The machine frame 11 is supported on the conveyor 6 by means of a plurality of guide devices, such as, for example, the front guide shoes 18, and, at the same time, at least one drive gear 19 close to the rear side of the machine frame 11 engages in a feed device attached to the conveyor 6, such as, for example, toothed racks 8, as this is known per se to the person skilled in the art of underground mining. As a result of the pivotability of the two cutting roller wheels 14, 15 via the swivel arms 16, 17, it is possible to ensure that, respectively, the leading cutting roller wheel 14 in the direction of travel F cuts away the working face at the roof, and the trailing roller wheel 15 cuts away the roof at the transition to the floor 3. The swivel positions of the two cutting roller wheels 14, 15 are set such that the total height of the machine frame 11 is covered.

In order to allow an optimal recognition of the interface, denoted in FIG. 1 with the reference symbol 9, in the region of the floor, where necessary, however, also of the interface in the region of the roof, with a suitable sensor system, a retaining box 20 for the accommodation of a georadar (not specifically represented) as a sensor system there is fastened in projecting arrangement to the front side 13 of the machine frame 11 of the shearer loader 10 in such a way that at least the uncut interface 9 at the transition of the working face 7 to the floor 3 can be scanned by means of radiated electromagnetic waves A of the georadar in the retaining box 20. For the recognition of the host rock, the refraction and diffraction characteristics at the interface 9 are analyzed via the different absorption and reflection R of minerals and host rock. A receiving module of the sensor system can receive the reflected signals R in order to acquire therefrom information about the interface, as well as the geology of the floor 3. A scanning of the interface at the roof could be realized by means of further sensors. The projecting fastening of the retaining box 20 with unobstructed "view" of the working face 7 ensures that the electromagnetic waves radiated from the sensor system in the retaining box 20 hit solely upon mineral rock or host rock which is to be removed, without obstruction from some components of the shearer loader.

Figure 3:
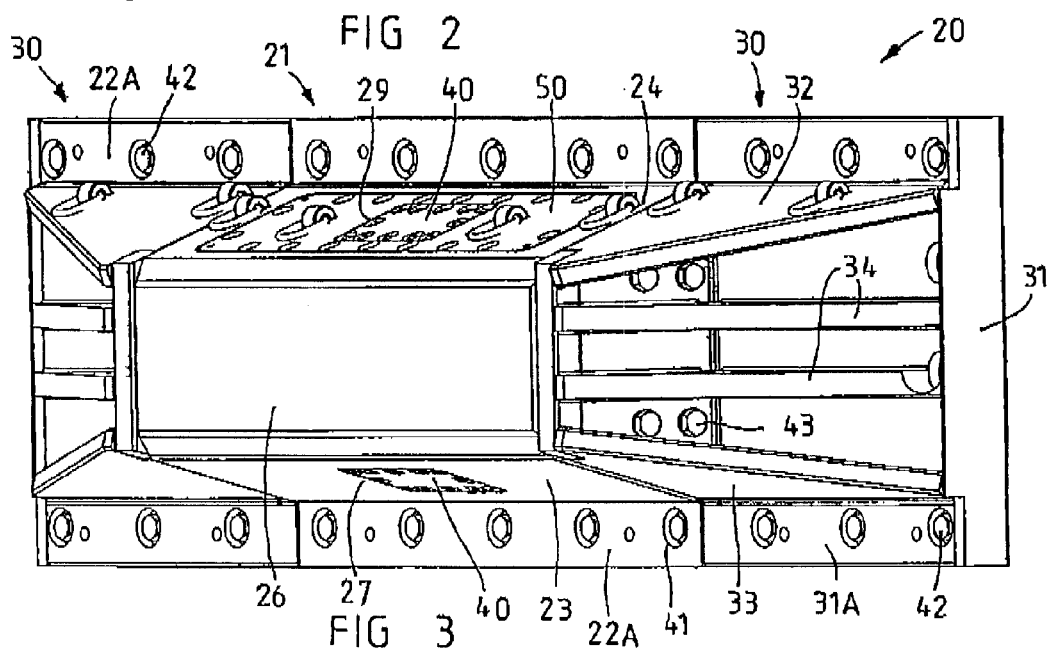
FIG. 3 shows a detailed view of a retaining box according to the invention for a georadar.
Figure 4:
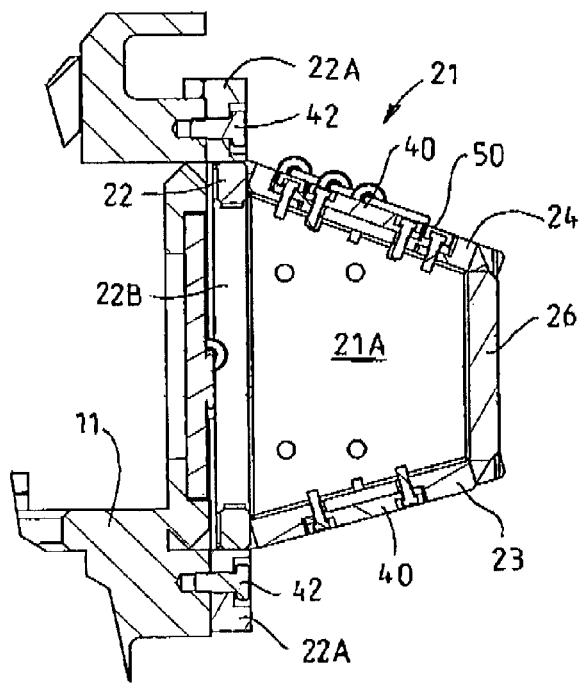
FIG. 4 shows in a vertical section the retaining box from FIG. 3 in fitted position on the machine frame.
Figure 5:
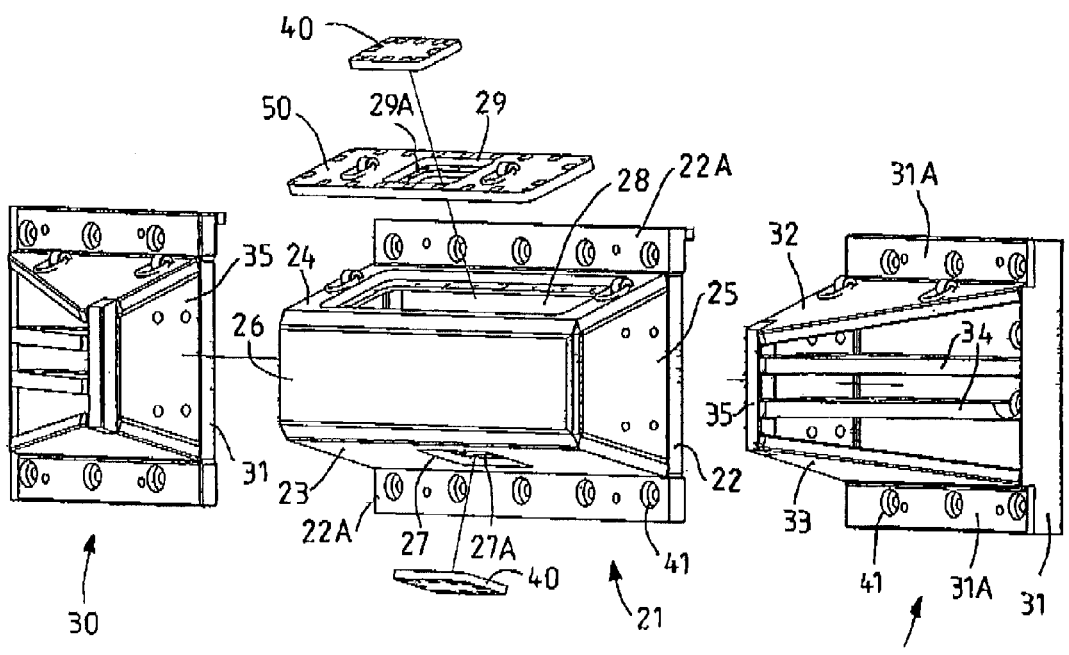
FIG. 5 shows the retaining box from FIG. 3 in exploded representation.

FIGS. 3 to 5, to which reference is now made, show a preferred illustrative embodiment of a corresponding retaining box 20 according to the invention for the accommodation of a georadar. The retaining box for the georadar (not represented) as a sensor system, which retaining box is denoted in its entirety with the reference symbol 20 in FIGS. 3 to 5, is of three-part construction and has an elongated, middle main box 21, to both sides of which are arranged mutually identically configured deflector elements 30. The main box 21, in which the sensor(s) for the georadar, inclusive of antennae, power supplies and signal guides etc., are disposed, consists of a strong rear wall 22, a bottom wall 23 and a roof wall 24, which respectively run obliquely to the rear wall 22, two lateral trapezoidal side walls 25, and an end wall 26, which are welded together to form a substantially closed housing. The retaining box 21 is more than twice as long as wide and, in particular, the end wall 26 consists of a rectangular, strip-shaped plate. Both the bottom wall 23 and the roof wall 24 of the main box 21 run obliquely up to each other and thereby taper the clear width of the retaining box 21 with increasing distance from the rear wall 22. The bottom wall 23 has in the center a rectangular, relatively small window opening 27. The roof wall 24, due to a relatively large, rectangular cutout 28, is almost fully cut out, apart from a narrow frame web, to enable, where necessary, when the housing box 21 is fitted, repair works or exchange works to the sensors of the georadar disposed in the reception space 21A of the retaining box 21 to be carried out through the large cutout 28. The relatively large cutout 28 is closed off by means of a metal closing plate 50, which itself, in turn, is provided with a relatively small window opening 29, the dimensions of which correspond exactly to the dimensions of the window opening 27 in the bottom wall 23. The window opening 27 in the obliquely oriented bottom wall 23 allows a free "view" of the working face in the region of the floor, by means of the sensors of the georadar, and the window opening 29 in the obliquely running roof wall 24 of the main box 21 allows a free view of the interface at the roof. Both window openings 27, 29 are closed off for hermetic blocking-off of the reception space of the retaining box by means of suitable protective plates 40, in particular plastics sheets, which, in the event of excessive wear, can be exchanged for other plastics sheets and can be screwed, for example, to steps 27A, 29A within the window opening 27, 29, or otherwise fixed. The back plate 22 of the main box 21 respectively protrudes with a screw hole punched strip 22A both beyond the bottom wall 23 and the roof wall 24 in the upward and downward direction respectively, and both punched strips 22A are provided with a suitable number of screw holes 41, to enable the main box 21 to be screwed to the machine frame 11 with a total of 10 fastening or clamping screws 42, as is shown, by way of example, in FIG. 4. For additional anchorage, clamping pins can be disposed on the rear side of the rear wall 22, and/or the rear wall has or forms stop bars, which cooperate positively with projections or depressions in the front side of the shearer loader, in order to be able reliably to absorb all forces transmitted into the main box 21 in operation. The cable supply for the sensors in the reception space 21A of the main box 21, and for further hydraulic lines or the like, is realized via a recess 22B in the rear wall 22 of the main box 21, the recess 22B preferably extending over approximately the total based area of the main box accommodating the georadar.

In order to protect the main box 21 with georadar as sensor system from damage and wear in spite of its exposed, projecting fastening to the front side of the machine frame, for both directions of travel deflector elements 30 are fitted to the side of the main box 21. Both deflector elements 30 consist of a strong back plate 31, here a total of four stiffening ribs, namely an upper stiffening rib 32, a lower stiffening rib 33, and two middle stiffening ribs 34, standing perpendicular to the back plate, which are of substantially triangular configuration and are welded with a transverse side to a trapezoidal connecting wall 35 welded on perpendicular to the back plate 31. The upper and the lower stiffening rib 32, 33 run obliquely to the back plate 31 with the same angular offset as the bottom wall 23 or roof wall 24 in the main box 21, so that, in the fitted position, they lie in alignment with these, as shown in FIG. 3. The deflector elements 30 widen in a wedge shape from the free end to the connecting wall 35, which in the fitted state bears against the side wall 25 of the main box 21 and is screwed to this via binding screws 43. The back plate 31 also protrudes with a screw hole punched strip 31A respectively beyond the upper stiffening rib 32 in the upward direction and the lower stiffening rib 33 in the downward direction, to enable the two deflector elements 30 to be fastened to the machine frame by means of a suitable number of clamping screws 42, here a total of six clamping screws 42. Clamping pins or the like can be provided in respect of the two deflector elements 30, in order to be able reliably to absorb all forces longitudinally and transversely to the directions of travel. It is advantageous, however, if both the clamping screws 42 and the possibly present clamping pins form predetermined breaking points, ensuring that the entire retaining box 20, inclusive of the deflector elements 30, falls off should a blockage arise between the retaining box and rock fragments, in order to prevent greater damage to the shearer loader or to the guide device for the shearer loader. In case of damage, only a new retaining box 20 would then need to be fitted.

In the shown illustrative embodiment, the deflector elements and the main box are fastened in a fixed position to the machine frame. By providing on the machine frame a plurality of punched strips lying one above the other, it would be possible to achieve mining in respect of lower thicknesses, given an otherwise identical structure. A height adjustability of the retaining box could also be achieved, however, by anchorage of the retaining box to a base plate and different positioning of the base plate on the front side of a shearer loader. The illustrative embodiment in FIG. 1 shows a scanning of the working face at the floor by means of georadar. Alternatively, just the roof, or both the roof and the floor, could be scanned by means of georadar. The georadar is preferably accommodated within a pressure-proof, intrinsically secure housing, and inserted with this in the main box. The main box could also be welded to the front side of the extraction machine, or otherwise fastened. In place of one main box for one or more georadars, a plurality of main boxes could also be fastened to the front side, in which case the deflector elements are preferably arranged to the side of all main boxes. Such and further modifications should fall within the scope of the appended claims.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An extraction system for mineral extraction, having a machine frame which is movable along a conveying device and which for each direction of travel, on its front side that, in operation, lies facing a working face, has hewing tools for the minerals to be won, and having a sensor system, disposed on the machine frame for mineral/host rock recognition, the extraction system having a retaining box for the sensor device, which retaining box is fastened in projecting arrangement to the front side of the machine frame, the retaining box housing the sensor system and having at least one of a downward and upward facing window opening, the at least one window opening being in one of a bottom wall and a top wall of the retaining box and which runs obliquely to a rear wall of the retaining box to enable the working face to be scanned by the sensor system at an angle relative to the rear wall.

2. The extraction system as claimed in claim 1, wherein the sensor system includes georadar.

3. The extraction system as claimed in claim 2, wherein at least one of the georadar and the retaining box is arranged centrally between the hewing tools.

4. The extraction system as claimed in claim 1, wherein the hewing tools are cutting rollers.

5. The extraction system as claimed in claim 1, wherein the retaining box comprises at least one screw hole punched strip that enables the retaining box to be at least one of height-adjustable and fastenable in different height positions to the machine frame.

6. The extraction system as claimed in claim 1, wherein the retaining box is of multipart construction and includes a main box accommodating the sensor system, the multipart construction further including at least one deflector element arranged to the sides of the main box.

7. The extraction system as claimed in claim 6, wherein the at least one window opening are configured in one of a bottom wall and a roof wall of the main box which run obliquely to a rear wall of the main box.

8. The extraction system as claimed in claim 7, wherein the roof wall is tapered by means of a cutout to a frame web, to which a closing plate having the window opening is fastened.

9. The extraction system as claimed in claim 6, wherein the at least on window is closed off by means of an exchangeable viewing plates for the georadar.

10. The extraction system as claimed in claim 6, wherein the main box is closed off by trapezoidal side walls and a rectangular end plate.

11. The extraction system as claimed in claim 6, wherein the at least one deflector element is fastened exchangeably to the machine frame and to the main box.

12. The extraction system as claimed in claim 6, wherein the at least one deflector element includes a back plate, a plurality of stiffening ribs and a trapezoidal end wall which are permanently joined together.

13. The extraction system as claimed in claim 12, wherein the stiffening ribs include upper and the lower stiffening rib that run obliquely to the back plate.

14. The extraction system as claimed in claim 7, wherein the at least one deflector element includes a back plate, a plurality of stiffening ribs and a trapezoidal end wall which are permanently joined together, the rear wall of the main box protruding beyond the roof wall and bottom wall, and the back plate of the at least one deflector protruding beyond at least one of the plurality of stiffening ribs, in the upward and downward direction respectively, and having a screw hole punched strip.

15. The extraction system as claimed in claim 14, wherein in the fitted state, the screw hole punched strip includes holes, the holes of the screw hole punched strip are passed through by at least one of clamping screws and dowel pins, the dowel pins serving to absorb the longitudinal and transverse forces and, at the same time, form predetermined breaking points between the machine frame and the retaining box.

16. The extraction system as claimed in claim 6, wherein the at least one deflector element is fitted with at least one of a cutter bar, a wear plate, and a surface layer hardening.

\* \* \* \* \*